(12) United States Patent
Huang et al.

(10) Patent No.: US 11,763,650 B2
(45) Date of Patent: *Sep. 19, 2023

(54) FOREIGN RFID TAG DISCRIMINATION AND MANAGEMENT

(71) Applicant: Tyco Fire & Security GmbH, Neuhausen am Rheinfall (CH)

(72) Inventors: John C. Y. Huang, Irvine, CA (US); Tamlyn J. Jones, Rancho Mission Viejo, CA (US); Eric F. Riggert, Trabuco Canyon, CA (US); Steven J. Raynesford, Mission Viejo, CA (US); Glen Ouellette, Huntington Beach, CA (US); Steve E. Trivelpiece, Rancho Santa Margarita, CA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 189 days.

This patent is subject to a terminal disclaimer.

(21) Appl. No.: 16/926,302

(22) Filed: Jul. 10, 2020

(65) Prior Publication Data

US 2020/0342729 A1    Oct. 29, 2020

Related U.S. Application Data

(63) Continuation of application No. 16/135,988, filed on Sep. 19, 2018, now Pat. No. 10,733,862.

(51) Int. Cl.
*G08B 13/24* (2006.01)
*G06K 19/07* (2006.01)

(52) U.S. Cl.
CPC ...... *G08B 13/2428* (2013.01); *G06K 19/0723* (2013.01); *G08B 13/2451* (2013.01); *G08B 13/2468* (2013.01)

(58) Field of Classification Search
CPC .................................................. G08B 13/2428
See application file for complete search history.

(56) References Cited

U.S. PATENT DOCUMENTS

| | | | |
|---|---|---|---|
| 9,519,811 B1* | 12/2016 | Simon | G06K 7/10306 |
| 10,733,862 B2* | 8/2020 | Huang | G06K 19/0723 |
| 2005/0104733 A1* | 5/2005 | Campero | G08B 13/2402 340/572.9 |
| 2008/0284600 A1* | 11/2008 | Drzaic | G01S 13/75 340/572.1 |
| 2010/0097223 A1* | 4/2010 | Kruest | E05B 47/0009 340/572.1 |
| 2010/0225448 A1* | 9/2010 | Arguin | G08B 13/242 340/10.1 |

(Continued)

*Primary Examiner* — Joseph H Feild
*Assistant Examiner* — Pameshanand Mahase
(74) *Attorney, Agent, or Firm* — ArentFox Schiff LLP

(57) ABSTRACT

Managing foreign RFID tags within a secured area involves use of a first RFID portal system to read tag data from an RFID tag present within a first portal zone. A processing device associated with the first RFID portal system is used to determine whether the RFID tag is entering the secured area. The determination is based on an evaluation of a direction of travel of the RFID tag through the first portal zone. Responsive to determining that the RFID tag is in fact entering the secured area, one or more operations are performed to cause a first tag value corresponding to the tag data to be added into a safe to exit (STE) list.

20 Claims, 11 Drawing Sheets

(56) References Cited

U.S. PATENT DOCUMENTS

| | | | |
|---|---|---|---|
| 2014/0171856 A1* | 6/2014 | McLaughlin | A61M 5/1723 705/14.58 |
| 2014/0225734 A1* | 8/2014 | Rasband | G08B 13/246 340/572.1 |
| 2014/0254890 A1* | 9/2014 | Bergman | G06V 40/161 382/118 |
| 2017/0178477 A1* | 6/2017 | Turgeon | G08B 13/2405 |

* cited by examiner

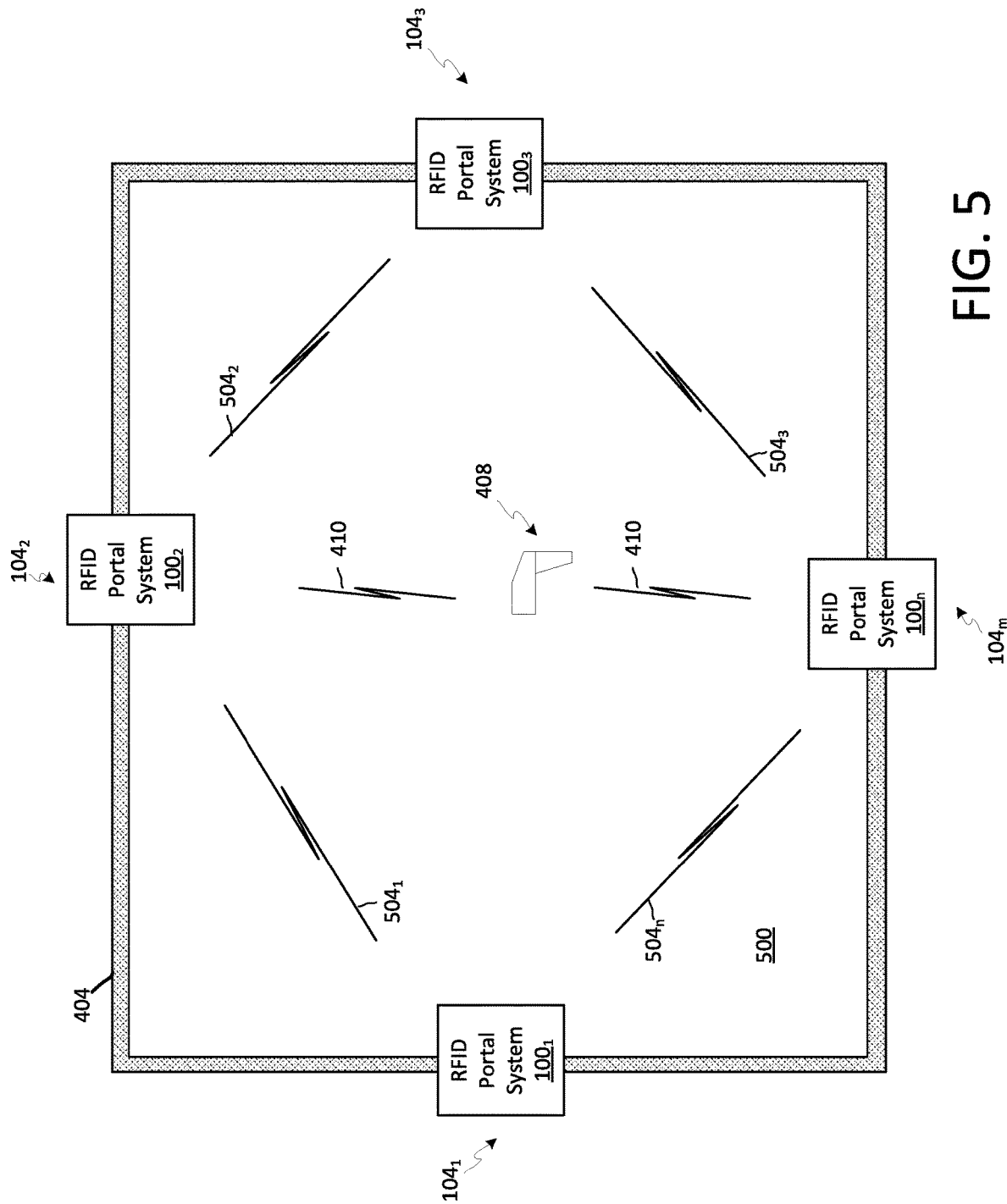

FOREIGN RFID TAG DISCRIMINATION AND MANAGEMENT

CLAIM OF PRIORITY

This application is a Continuation Application of U.S. patent application Ser. No. 16/135,988 filed Sep. 19, 2018, entitled: "FOREIGN RFID TAG DISCRIMINATION AND MANAGEMENT", the entire contents of which are hereby incorporated by reference.

BACKGROUND

Statement of the Technical Field

The technical field of this disclosure concerns RFID systems, and more particularly RFID portals which process RFID tags at an entrance to a secured facility.

Description of the Related Art

An RFID portal is a system which is used for tracking items passing through doorways, hallways or corridors. Conventional RFID portals identify the direction of RFID tags crossing a portal transition defined by a choke point through which items must pass when they move from one defined area to a second defined area. In many implementations, an RFID portal determines tag directionality, which refers to a direction the tag is moving through the choke point. A common purpose for determining tag directionality is to discriminate between those tags which are attached to items which are entering a secured facility as compared to those tags which are attached to items that are leaving the secured facility.

In some systems, tag directionality is determined by the order in which tags are read. For example, a tag read by a first antenna and then by a second antenna spaced a distance apart from the first antenna, is likely moving from the first to second antenna. More advanced systems can also use beam steerable antennas to detect the presence of RFID tags in different locations as they move through a portal zone. One example of a system for determining tag directionality is disclosed in U.S. Pat. No. 9,519,811 to Simon, et al.

A number of organizations have set standards for RFID tags. One type of RFID tag for which a standard has been established is known as an EPCglobal UHF Class 1 Generation 2 (hereinafter "EPC Gen2") type tags. These tags have certain well known characteristics.

SUMMARY

This document concerns a method and system for managing foreign RFID tags within a secured area. In a method disclosed herein, a first RFID portal system is used to read tag data from an RFID tag present within a first portal zone. At least one processing device associated with the first RFID portal system is used to determine whether the RFID tag is entering the secured area. According to one aspect, the determination can be based on an evaluation of a direction of travel of the RFID tag through the first portal zone. Responsive to a determination that the RFID tag is in fact entering the secured area, one or more operations are performed to cause a first tag value corresponding to the tag data to be added into a safe to exit (STE) list. This STE list can be maintained in an electronic data storage device accessible to the at least one processing device, and specifies one or more RFID tags which are permitted to leave the secured area without triggering an alarm.

Thereafter, a second RFID portal system is used to read a departing tag data from a departing RFID tag that is exiting the secured premises. The second RFID portal system is selectively prevented from generating an alert if a second tag value associated with the departing tag data matches at least one tag value stored in the STE list. In some scenarios, the second RFID portal system can be the first RFID portal system, but in other scenarios the second RFID portal system can be distinct from the first RFID portal.

According to one aspect, the first tag value is advantageously communicated to a central server in communication with the first and second RFID portal systems. According to another aspect, the first tag value is communicated to at least the second RFID portal system. Accordingly, the STE list can be advantageously maintained at both the first and second RFID portal systems. The first tag value can be selectively removed from the STE list responsive to at least one manual user control or intervention operation. Further the first tag value can be automatically selectively removed from the STE list after a predetermined duration of time.

According to another aspect, the first tag value can be automatically selectively prevented from being added to the STE list when the at least one processing device determines that the first RFID tag has entered the secured area concurrent with a predetermined number of other RFID tags. In some scenarios, the method can involve automatically selectively preventing the addition to the STE list of one or more of the tag values during at least one predetermined period of time.

The solution also concerns an RFID portal system for managing foreign RFID tags within a secured area. The system includes a first RFID portal comprising a first RFID reader which has an associated control unit. The control unit is configured to generate one or more commands to cause the first RFID reader to read tag data from an RFID tag present within a first portal zone and determine, based on an evaluation of a direction of travel of the RFID tag through the first portal zone, whether the RFID tag is entering the secured area. In response to a determination that the RFID tag is entering the secured area, the control unit will perform at least one operation to cause a first tag value corresponding to the tag data to be added into a safe to exit (STE) list maintained in at least one electronic data storage device. The STE list specifies one or more RFID tags which are permitted to leave the secured area without triggering an alarm.

The RFID portal system can also include a second RFID portal similar to the first RFID portal system. The second RFID reader can include a second control unit configured to generate one or more commands. These commands can cause the second RFID reader to read a departing tag data from a departing RFID tag that is exiting the secured premises, and selectively prevent the second system controller from generating an alert if a second tag value associated with the departing tag data matches at least one tag value in the STE list. In some scenarios, the second RFID portal system is the first RFID portal system. In other scenarios the second RFID portal system can be distinct from the first RFID portal system.

The system can further include a central server which is configured to facilitate distribution of information concerning the content of the STE list, from the first RFID portal system to at least the second RFID portal system. Alternatively, the first RFID reader can be configured to directly communicate the first tag value to at least the second RFID reader for updating an STE list. Notably, each of the first and second RFID reader is configured to maintain a local copy of the STE list in a first and second local data storage device.

In the RFID portal system described herein, one or more of the RFID readers can be configured to selectively remove the first tag value from the STE list responsive to at least one manual user control operation. In some solutions presented herein, the one or more RFID readers are configured to selectively remove the first tag value from the STE list after a predetermined duration of time. Further, the first RFID reader can be configured to automatically selectively prevent the first tag value from being added to the STE list upon a determination that the first RFID tag has entered the secured area concurrent with a predetermined number of other RFID tags. The first RFID reader can also be configured to automatically selectively prevent the addition to the STE list of one or more of the tag values during at least one predetermined period of time.

BRIEF DESCRIPTION OF THE DRAWINGS

This disclosure is facilitated by reference to the following drawing figures, in which like numerals represent like items throughout the figures, and in which:

FIG. 5 is a drawing that is useful for understanding a communications arrangement among a plurality of RFID portal systems.

DETAILED DESCRIPTION

Figure 1:
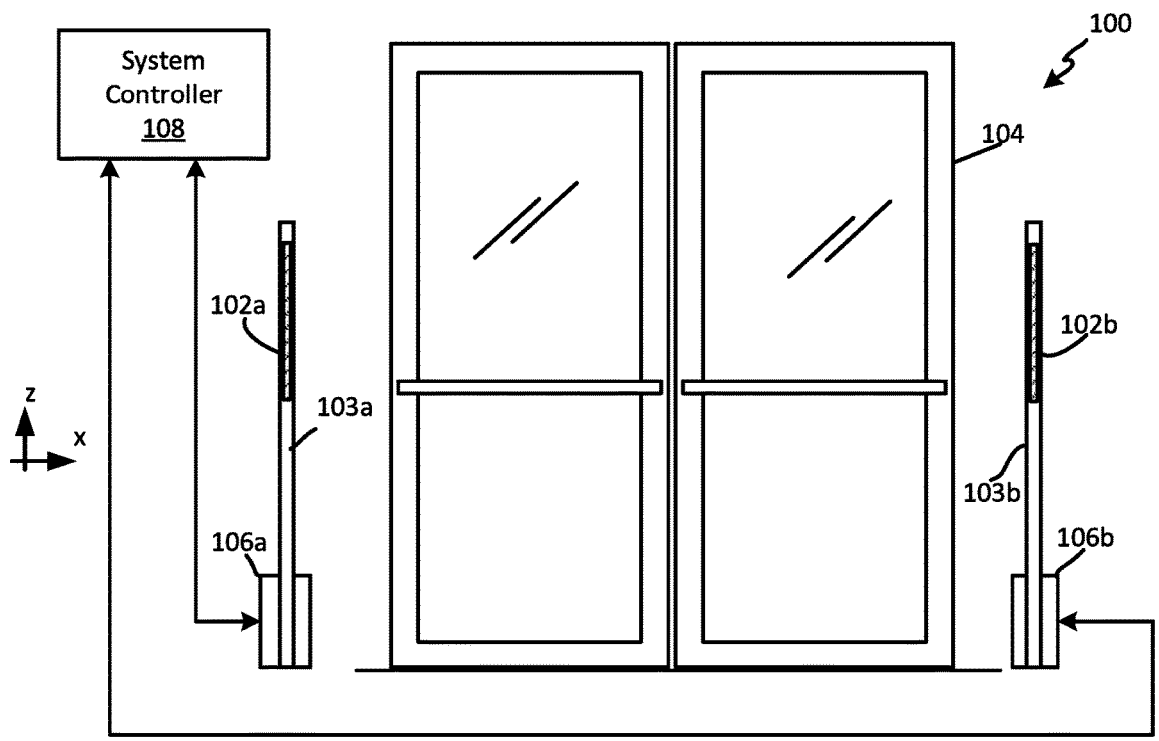
FIG. 1 is a plan view of an RFID portal system at a choke point.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

The solution concerns a method and system for managing foreign RFID tags within a secured area. For purposes of this disclosure, a foreign RFID tag can be understood to be any RFID tag which enters a RFID secured area through a choke point that is monitored by an RFID portal. For example, consider a scenario in which the secured area is a retail store location. A foreign RFID tag may be one that is attached to merchandise that a customer has previously purchased at another retail store. Since the merchandise was already purchased at a different store, it would be undesirable for the RFID tag to trigger an alarm when it is subsequently detected leaving the secured location.

One way to prevent such alarms could involve restricting the RFID portal so that it will automatically filter out (i.e. prevent alarms) for RFID tags having specific tag data and/or tag header data. However, this approach is not scalable for large retail facilities which utilize source tagging methods. Another approach could involve comparing tag read data from detected RFID tags to a database specifying data exclusively associated with those tags which will trigger an alarm. For example, this approach could involve a list of specific Electronic Product Codes (EPCs) associated with RFID tags which will trigger an alarm. However, this approach does not adequately address all potential use cases, such as those involving merchandise returns.

A solution to the foregoing problem can involve using an RFID portal system to read tag data from an RFID tag present within a portal zone. At least one processing device associated with the RFID portal system is used to determine whether the RFID tag is entering the secured area. For example, this determination can be based on an evaluation of a direction of travel of the RFID tag through the portal zone. In response to a determination that the RFID tag is entering the secured area, the processing device will cause a first tag value corresponding to the tag data, to be added into a safe to exit (STE) list. The STE list specifies one or more RFID tags which are permitted to leave the secured area without triggering an alarm. The STE list is maintained in an electronic data storage device accessible to the processing device. In some scenarios, the tag value can be the same as the tag data, but this is not a requirement and in some instances the tag value can be derived from all or part of the tag data.

Thereafter, a second RFID portal system may read tag data from a departing RFID tag that is departing or exiting the secured premises. A departing RFID tag has the potential to trigger an alarm when it is determined that the tag is exiting the secured premises. To prevent such an alarm, the second RFID portal system will automatically inhibit an alert if a tag value associated with the departing tag data matches at least one tag value stored in the STE list. In some scenarios the first and second RFID portal system can be the same portal system. However, the solution is not limited in this respect. In other scenarios (e.g., where a secured area includes two or more entrances and exits), the second RFID portal system can be distinct from the first RFID portal system. In such a scenario, the second RFID portal may be associated with a second portal zone of the secured area that is distinct from the first portal zone. When a particular secured area includes multiple entrances and exits, there could of course be numerous distinct RFID portal systems, each associated with a different entrance or exit.

Figure 2:
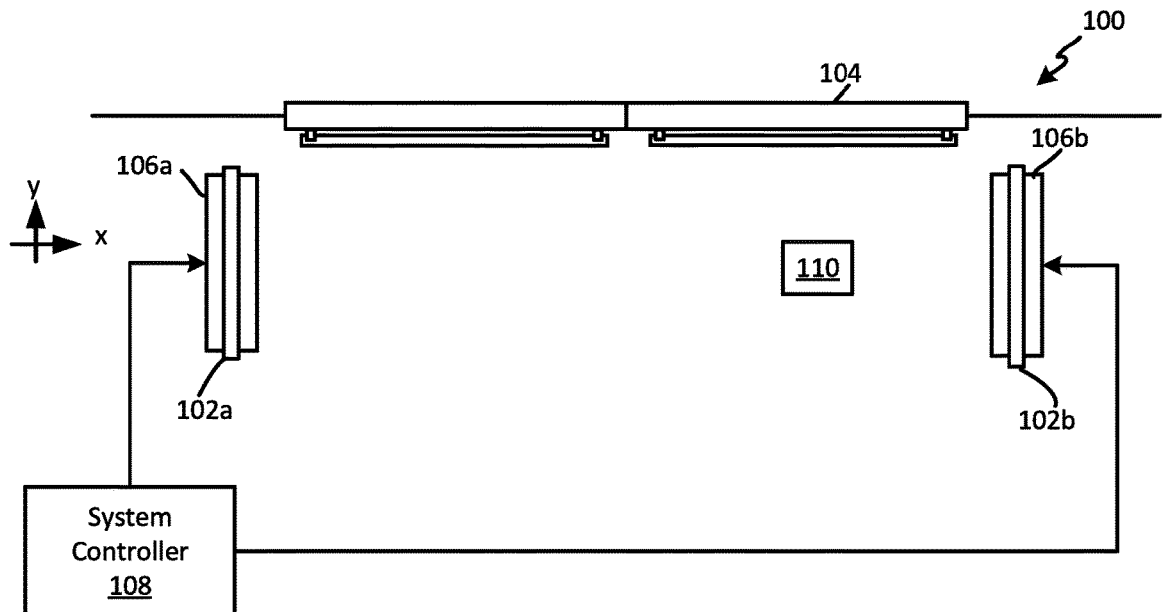
FIG. 2 is a top view of the RFID portal system in FIG. 1.
Figure 3:
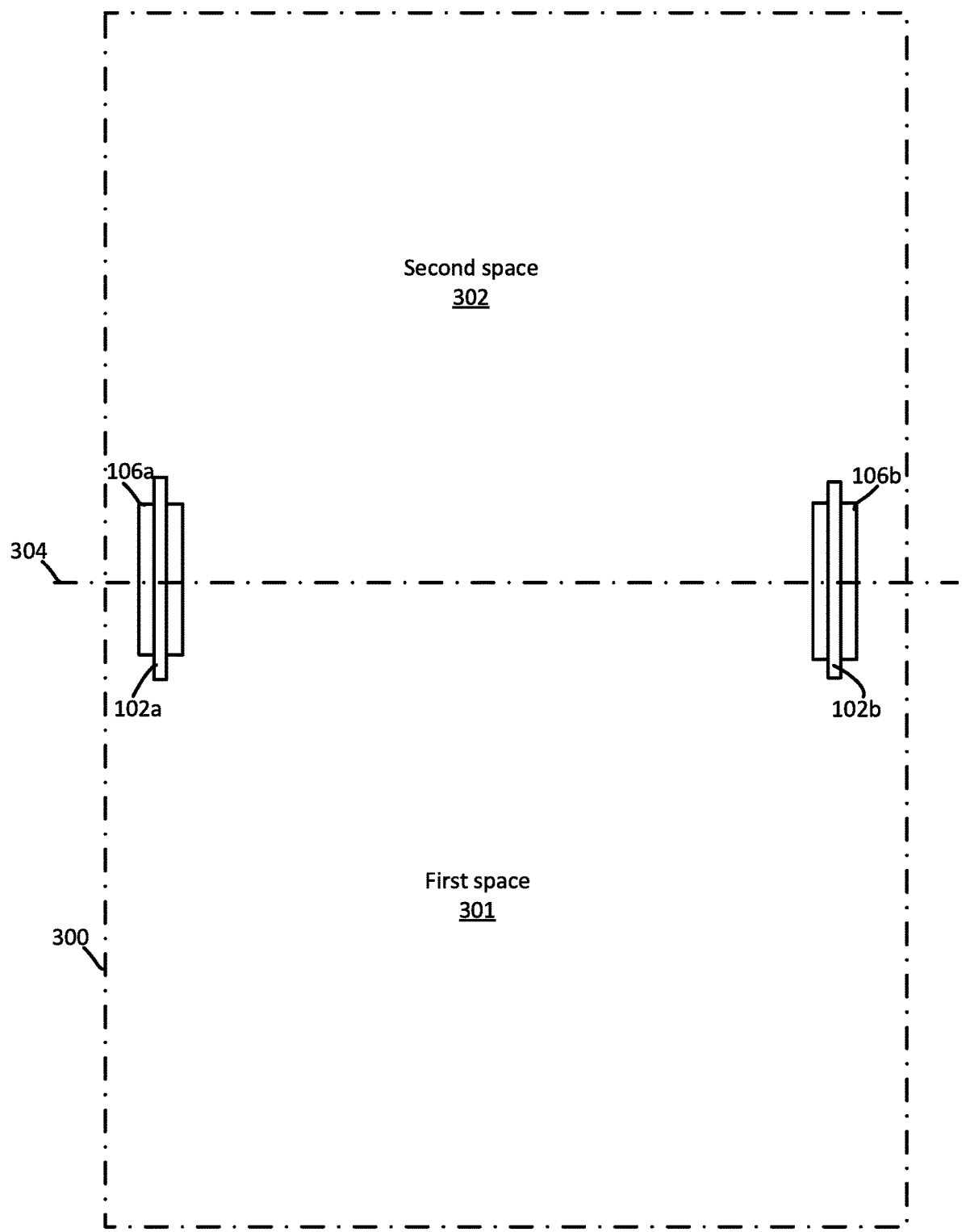
FIG. 3 is a drawing that is useful for understanding the concept of a portal zone surrounding the RFID portal system in FIG. 1.

In FIGS. 1-3 there is shown an RFID portal system 100 which is useful for understanding certain aspects of a solution for managing foreign RFID tags in a secure environment. The RFID portal system includes two RFID readers 106a, 106b and each of them are respectively attached to antennas 102a, 102b mounted on sides of the portal. RFID readers are well known in the art and therefore will not be described here in detail. However, it should be understood that an RFID reader as referenced herein will be capable of generating RFID tag exciter signals to control and elicit responses from one or more of a plurality of RFID tags in a RFID portal zone. The RFID exciter signals can also serve as a source of power for energizing the RFID tags.

The exciter signals generated by the RFID reader and responses received by the reader will be in accordance with an RFID system standard that is now known or known in the future. The RFID tag reader will also be capable of detecting, identifying and/or processing one or more the responses from the plurality of RFID tags in a portal zone. In some scenarios, certain control functions of the RFID reader can be handled by a system controller 108. In such scenarios, the RFID readers can include suitable interface circuitry to facilitate communications with a system controller 108 as described below. For example, the interface circuitry can facilitate communication of information regarding detected responses received from RFID tags. Such interface circuitry can also facilitate reception of interrogation commands and/or antenna beam control commands from the system controller.

In the arrangement shown, the antennas are mounted on pedestals 103a, 103b, but the solution is not limited in this regard. The antennas could be mounted in the ceiling, on a wall, or in the ground, and the method described herein would still be applicable. There is no restriction regarding the type of antennas which are used to produce the required field patterns. Each of the antennas 102a, 102b can be comprised of one or more antenna elements. In some scenarios, the one or more individual antenna elements can be comprised of planar antenna elements which may be disposed on a suitable dielectric substrate. One example of such a planar antenna element includes a patch antenna. Patch antennas are well known and therefore will not be described in detail. However, it should be understood that the one or more patch antenna elements can be used to achieve a particular set of beam patterns that is required for a particular application. For example, the patch antennas can be configured to operate independently or in a phased array configuration to produce one or more desired beam patterns. The various types of antenna beam forming methods are beyond the scope of this disclosure and therefore will not be described in detail. However in one possible scenario, each antenna 102a, 102b may be comprised of two (2) or in some cases four (4) patch antennas which are housed inside of each pedestal 103a, 103b.

In the example shown, the antennas 102a, 102b are understood to be beam steerable so that multiple different antenna beam directions can be obtained from a single antenna 102a, 102b. Control over the required antenna field patterns can be facilitated by the RFID readers as noted above. Also, two antennas are shown in FIG. 1, but it should be understood that the solution is not limited in this regard. The inventive arrangements described herein could be implemented using a single beam steerable antenna.

The RFID portal system 100 can be placed in the vicinity of a physical choke point 104 in a facility where goods and items must pass through in order to transition from one space to a second space. In the example shown in FIGS. 1 and 2, the choke point 104 is a doorway, but other scenarios are possible. In some scenarios the RFID readers 106a, 106b can be operated under the command of a system controller 108 which facilitates the detection of one or more RFID tags 110 within a field of view of each antenna as hereinafter described. In other scenarios the functional features associated with the system controller 108 as described herein can be integrated with the RFID reader, in which case there is no need for a separate system controller 108.

As shown in FIG. 3, the RFID portal system 100 will define a boundary 304 which separates a portal zone 300 into a first space 301 and a second space 302. The portal zone generally defines the area in which the RFID portal system 100 is capable of detecting and reading RFID tags. The portal zone is shown as a regular rectangular shape in FIG. 3, but it should be understood that the actual shape of the zone can be somewhat irregular, as it will depend on the portal reader, antenna system and environmental factors which defines the field of view of the system. The first space and the second space are respectively physical spaces or areas of the portal zone defined on opposing sides of the boundary as shown. The RFID portal system in a solution described herein will (1) inventory all tags crossing the portal between the first and second space, (2) provide enough reads per crossing tag to determine directionality of such movement. In some scenarios, the RFID portal system can also (3) inventory all static tags in the portal zone surrounding the portal.

In a solution disclosed herein an RFID portal system 100 is configured to detect a direction of travel with respect to RFID tags that are passing between the first space 301 and the second space 302. These types of RFID portal systems are known in the art and therefore will not be described here in detail. However, it should be understood that various techniques can be applied to extract such directional information from a series of RFID tag reads, and any RFID portal system that is capable of such directional detection can be used for this purpose.

For example, it is known, that tag directionality can be determined by the order in which tags are read. In such scenarios, an RFID portal system can read a tag using two separate antennas which are spaced a distance apart. In such scenarios an RFID tag that is read by a first antenna and then by a second antenna at a later time, is likely moving from the first antenna to the second antenna. More advanced systems use beam steerable antennas to detect the presence of RFID tags in different locations as they move through a portal zone. One example of a system for determining tag directionality is disclosed in U.S. Pat. No. 9,519,811 to Simon, et al., the entirety of which is incorporated herein by reference.

Figure 4:
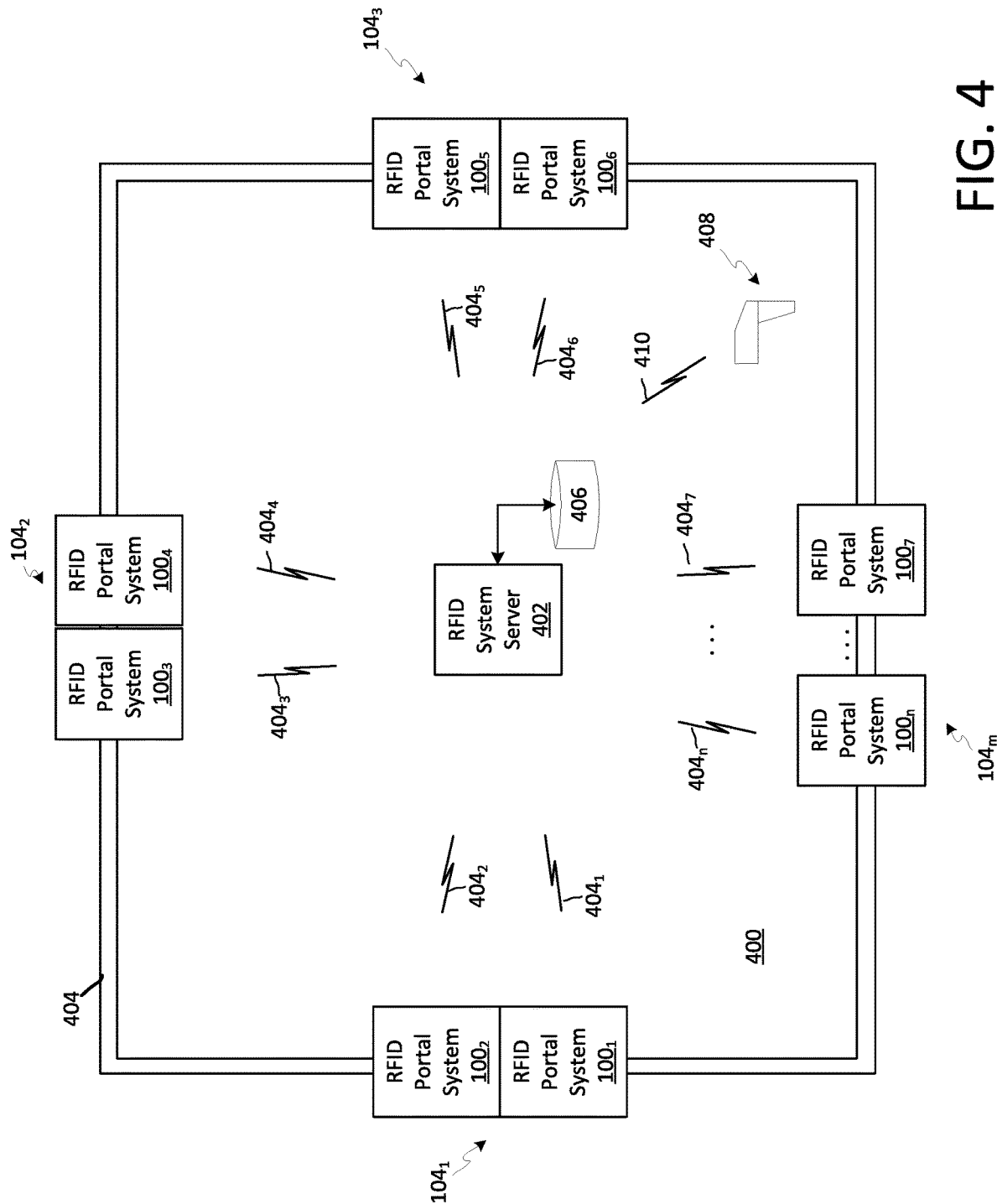
FIG. 4 is a diagram that is useful for understanding how a plurality of RFID portal systems shown in FIGS. 1-3 can be integrated into choke points around a secured facility.

As shown in FIGS. 4 and 5, a secured area 400, 500 can have one or more RFID portal system $100_1 \ldots 100_n$ (where n is some integer number), each of which may be placed in the vicinity of a physical choke points $104_1$, $104_2$, $104_3$, $\ldots 104_m$ (where m is an integer). Each of the RFID portal systems is aligned with a boundary 504 which can be understood to separate the secured areas 400, 500 from unsecured areas. The physical choke points may define a location of a facility where persons, goods and/or items must pass through in order to transition from one space (e.g., secured area 400) to a second space (unsecured space) exclusive of the first space. Each of the choke points $104_1$, $104_2$, $104_3$, $\ldots 104_m$ can be associated with a doorway, but the solution is not limited in this regard and other scenarios are possible. Each RFID detection system $100_1$-$100_n$ can be similar to the RFID detection system described herein with respect to FIGS. 1-3.

In a scenario shown in FIG. 4, the RFID portal systems $100_1$-$100_n$ can each communicate with a RFID system server 402 to coordinate RFID operations. The RFID system server 402 and a data store 406 to which it has access can be located at the secured facility 400. However, in some scenarios one or both of these components can be situated at a location that is remote from the secured facility. Communications with the RFID server 402 can be facilitated by means of a plurality of communication links $404_1$-$404_n$. In an alternative scenario shown in FIG. 5, the RFID portal systems $100_1$-$100_n$ can communicate directly with other RFID portal systems $100_1$-$100_n$ to coordinate RFID operations. For example, such communications can be facilitated by means of a plurality of communication links $504_1$-$504_n$.

Communication links $404_1$-$404_n$, $504_1$-$504_n$ can be comprised of any suitable type of wired or wireless communication link. In some scenarios, the communication links $404_1$-$404_n$, $504_1$-$504_n$ can be comprised of a local area network utilizing a conventional well known wired or wireless LAN standard, such as Ethernet or IEEE 802.11. Of course the solution is not limited in this regard and any other suitable link layer communication standard can be used to implement such communications. In some scenarios, the communications links can be implemented using a suitable application layer communication protocol, such as the well-known Message Queuing Telemetry Transport (MQTT) to facilitate such communications. Still, the solution is not limited in this regard and other types of application layer protocols can also be used for this purpose.

Figure 6A:
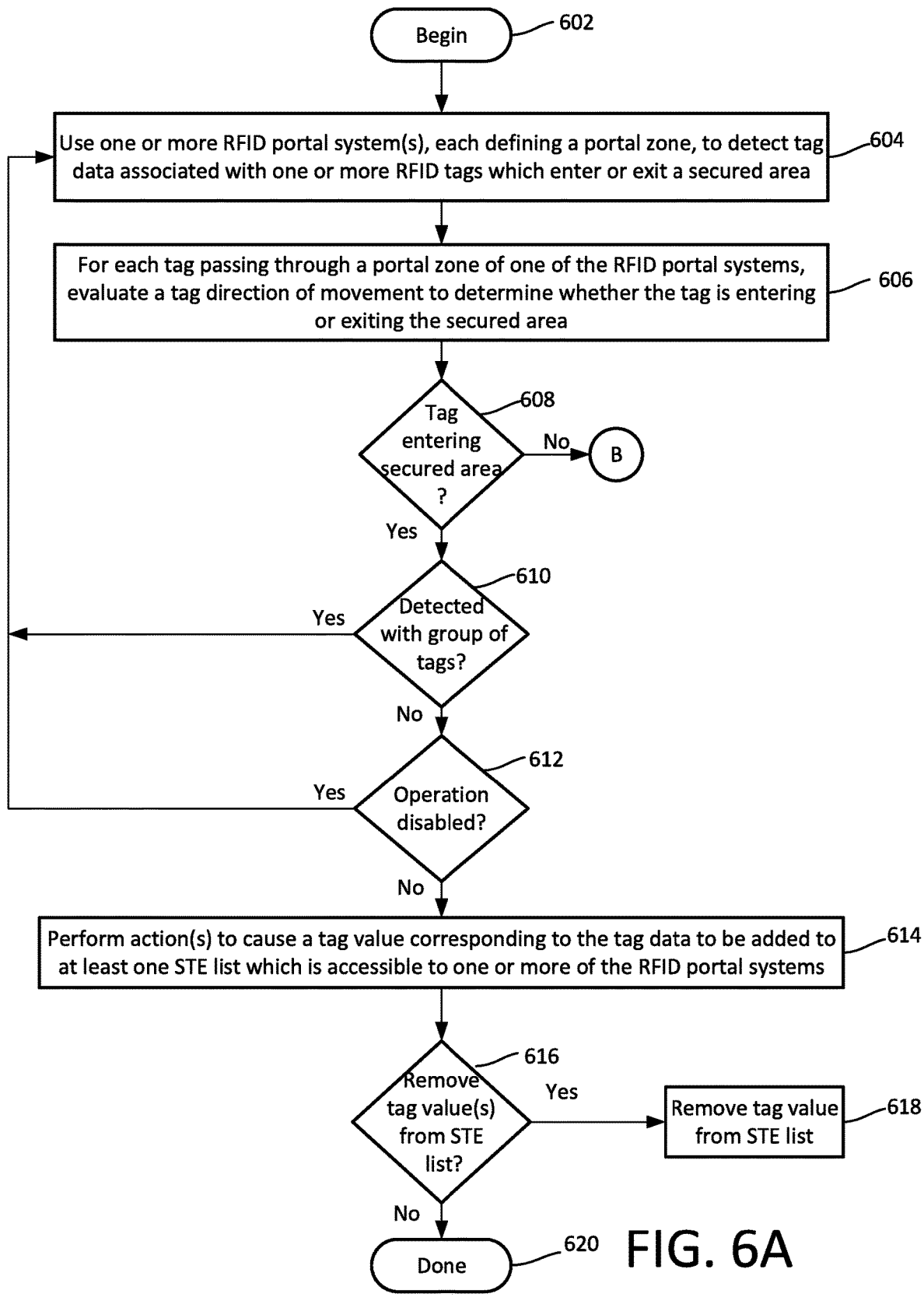
FIGS. 6A-6B are a set of flowcharts that are useful for understanding a foreign RFID tag management system.
Figure 6B:
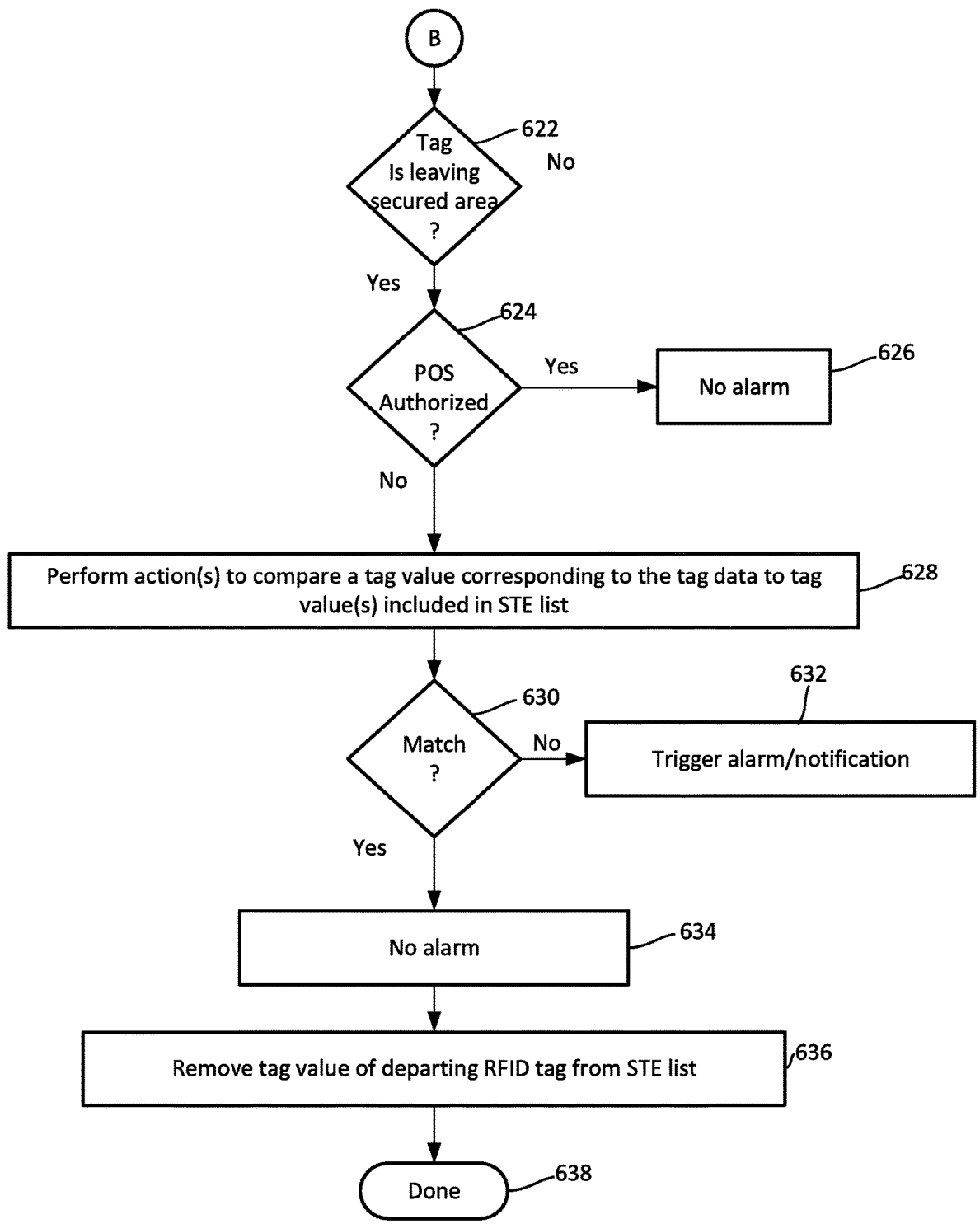

The operation of a system as shown in FIGS. 1-5 is described below in further detail in relation to the flowcharts which are shown in FIGS. 6A and 6B. The process begins at 602 and continues at 604 where one or more RFID portal systems (e.g., RFID portal system(s) 100), each defining a portal zone (e.g., a portal zone 300), are used to detect tag data associated with one or more RFID tags which enter or exit a secured area (e.g., a secured area 400, 500). In some scenarios, the tag data which is read from each tag can comprise an Electronic Product Code or EPC associated with the particular RFID tag which has been read. For each tag passing through the portal zone of one of the RFID portal systems, a tag direction is evaluated at 606. This evaluation is configured to determine whether the tag is entering or leaving the secured area (e.g., secured area 400, 500). This evaluation can be performed by a system controller 108 or by certain logic circuitry associated with the RFID reader 106a, 106b.

Figure 7:
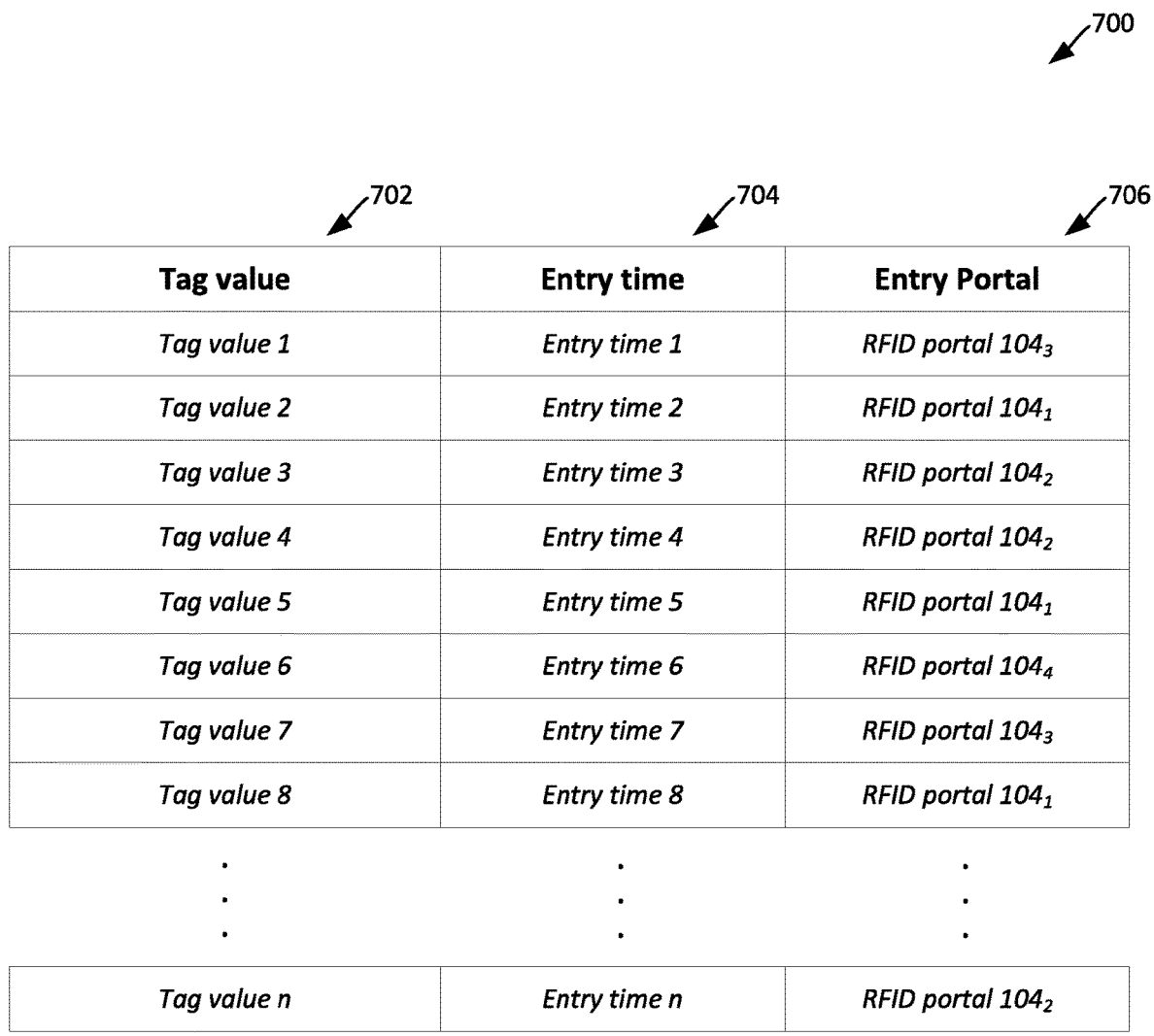
FIG. 7 is a drawing that is useful for understanding a safe to exit ("STE") list.

If the RFID tag is entering the secured area (608: Yes) from the external unsecured environment, then it is considered a foreign tag and it can be inferred that the tag should not trigger an alarm when the tag exits the secured area. In such a scenario, information pertaining to the detected tag can be added to a safe to exit (STE) list at 614. This information is sometimes referred to herein as a tag value. An example of an STE list 700 is shown in FIG. 7. The STE list 700 can comprise one or more tag values 702 which are associated with those RFID tags which will be permitted to exit the secured facility without triggering an alarm. The STE list can in some scenarios also include certain metadata for each tag value. For example, the metadata can include time stamp data 704 indicating an entry time when the tag was detected entering the secured facility. Similarly, the metadata can include other potentially useful information, such as portal data 706 indicating the particular RFID portal system $104_1$-$104_m$ where the RFID tag was detected as entering the secured facility.

In some scenarios the tag value that is stored in the STE list can be the same as the data that is read from the RFID tag. For example, in some scenarios the EPC data that is read from the RFID can be stored in the STE list without alteration. However, the solution is not limited in this regard and in other scenarios a tag value can be directly or indirectly derived from the actual data that is read from the RFID tag. For example, the tag value can comprise a portion of the data which is read from the tag. In such a scenario if the RFID tag data is an EPC value, then the tag value stored in the STE list could be comprised of a selected portion of the EPC data. Alternatively, the tag value could be a value that is calculated based on the value that has been read from the RFID tag.

There are some circumstances when an RFID tag detected entering the secured facility is not an appropriate candidate for inclusion on the STE list. For example, when a facility is resupplied or stocked with merchandise or other goods to which RFID tags are attached, such tags should not be included in a STE list. If the information pertaining to such RFID tags were added to the STE list, then a theft alarm would not be generated when those RFID tags are detected leaving the secured facility. To prevent such an undesirable result, a determination can be made at 610 as to whether an RFID tag which has been detected entering into the secured area is detected concurrently with numerous other RFID tags also entering the secured facility. If so, (610: Yes) then this will serve as an indication that the detected RFID tag is included with new inventory which is being used to replenish the secured facility. In such a scenario, information concerning the detected RFID tag will not be added to the STE list, and the process can return to 604.

In other scenarios, it can be desirable to disable the process which inserts tag values for detected RFID tags to the STE list. This operation can be performed manually and/or automatically. Disabling such process (612: Yes) can be performed manually in response to a user command. For example, a clerk or associate at the secured facility can disable the insertion of new tag values to the STE list at a time when a shipment of new inventory is being received at the secured facility. Alternatively, the disabling process can occur automatically (e.g., at predetermined time each week, or after normal business hours) when it is anticipated that new shipments of merchandise or other RFID tagged goods are to be received at the secured facility. If the STE list registration process has been disabled (612: Yes) then the process can return to its RFID tag monitoring operations at 604.

If the RFID tag entering the secured facility is not detected as concurrently entering with numerous other RFID tags (610: No), and the STE list operations have not been disabled (612: No) then the process can continue to 614. At 614 the system controller will perform actions to cause a tag value corresponding to the tag data of the detected incoming RFID tag to be added to at least one STE list which is accessible to one or more of the RFID portal systems that are associated with a particular secured area. These operations can include communication of certain data to other devices in the system to facilitate updating of STE lists maintained by such devices. The communicated data can include one or more of tag data, tag values, a time when the RFID tag was detected entering the secured facility, and the particular RFID portal where the tag entered the facility. These communication operations are discussed below in greater detail In some scenarios, the STE list can be stored in a data store 406 associated with a RFID system server 402. However, it is advantageous to ensure that a complete updated copy of the STE list is stored at each of the RFID portal systems. For example, the STE list could be stored in a memory or data storage device (not shown in FIGS. 1-5) which is accessible to the system controller 108, and/or the RFID reader 106a, 106b). Storing a copy of the STE list at each of the RFID portal systems is advantageous as it minimizes potential latencies caused by communications with servers and/or other RFID portal systems that are physically remote. Such latencies are to be avoided when possible because an RFID portal system which detects an RFID tag exiting the secured facility must generate alarms (or determine that no alarm should be generated) in real time as RFID tags are detected leaving the secured facility.

In some scenarios, the presence of an STE list at each of the RFID portal systems is facilitated by communicating RFID tag data and/or tag values to an RFID system server 402, which maintains a master STE list. For example, at 614 an RFID portal system which detects a foreign RFID tag entering the secured facility can communicate the tag data and/or tag value to the RFID system server 402. The various RFID portal systems $100_1$-$100_n$ can then periodically communicate with the RFID system server 402 to request STE list updates. When updates are received from the central server, each of the remaining RFID portal systems $100_1$-$100_n$ can update the tag values which are contained on their respective STE lists to include tag values for RFID tags detected entering the secured facility.

In other scenarios, the presence of an STE list at each of the RFID portal systems is facilitated by communicating RFID tag data and/or tag values directly among the RFID portal systems. For example, at 614 an RFID portal system $100_1$ which detects a foreign RFID tag entering the secured facility can communicate the tag data and/or tag value directly or indirectly to one or more of the other RFID portal systems $100_2$ . . . $100_n$. This communication could be a multicast communication across a peer-to-peer network or could employ retransmission of the information by other RFID portal systems participating in the network. However, the solution is not limited in this respect and the exact nature of the communication network is not critical. When updates are received, each of the RFID portal systems $100_1$-$100_n$ can update the tag values which are contained on their respective STE lists to include tag values for RFID tags detected entering the secured facility.

There can be scenarios when an RFID tag value which has been added to the STE list will subsequently need to be removed from such list. For example, such a scenario can arise in a retail store context where a customer wishes to return merchandise which has been previously purchased. Note that when the customer arrives at the retail store (secured facility) an RFID tag attached to the returning merchandise will be detected as it enters the store. Consequently, the tag value associated with the RFID tag will be stored in the STE list(s). When the merchandise return and/or exchange is completed the returned merchandise will once again be a part of the retail store inventory. At this point, if an RFID tag attached to such merchandise is detected leaving the secured facility without authorization, such departure should trigger a theft alarm. Accordingly, the tag value associated with such RFID tag should no longer be included on the STE list.

A similar scenario can arise when a shipment of new merchandise has been received at the secured facility. The shipment may not include a sufficient quantity of RFID tags entering the store concurrently at 610 such that the tag values are excluded from the STE list at 610. In other scenarios, the excluding action initiated at 610 may be intentionally disabled or absent from a particular system. In other scenarios, a shipment of new merchandise may enter into the secured facility at a time when the operation of the system has not been disabled at 612. In these and other scenarios, it can be advantageous to have the ability to cause tag values associated with certain RFID tags to be removed from the STE list.

Accordingly, for those scenarios when it is desirable to remove a particular tag value from the STE list, a determination can be made at 616 as to whether a user input has been received to indicate that a particular tag value should be removed from the STE list (616: Yes). In some scenarios, this determination can involve a user input which may be facilitated by an RFID reader 408 (e.g., a handheld RFID reader) for reading tag data from a particular RFID tag. According to one aspect, the RFID tag which is read with RFID reader 408 may be associated with merchandise that is being returned or exchanged in a retail store setting. The tag reading operation can be performed by a sales associate who follows a point of sale return process. In other scenarios, the RFID tag that is read may be associated with a shipment of new merchandise which has been delivered to the store.

In either case, a user can use the RFID reader 408 to read the RFID tag(s) to determine tag data for one or more RFID tags which are to be removed from the STE list. The RFID reader can be further configured to communicate with the RFID system server and/or the RFID portal systems at 616. When such communication is received by an RFID portal system and/or an RFID system server 402 it can comprise an indication that a particular tag value for such RFID tag should be removed from an STE list. Such communications can be facilitated using a wired or wireless communication link 410. The wired or wireless communication link can in some scenarios be compatible with network communications conducted using communication links $404_1$ . . . $404_n$, $504_1$ . . . $504_n$. Thereafter, the tag value is removed from the STE list at 618. As a result of this removal from the STE list, the particular RFID tag corresponding to the removed tag value will trigger an alarm if it is detected departing from the secured facility. The process can terminate at 620 or can continue with other processing. For example the process can return to 604 where the one or more RFID portal systems will continue detecting tags which enter into a portal zone.

In other scenarios, the process for removing tag values from the STE list at 616 can be automated. For example a timing or time-out mechanism can be used to facilitate such automatic removal of tag values from the STE list after a predetermined period of time. Recall that the STE list can in some scenarios include time stamp metadata 704 for each tag value, which specifies an entry time when each particular foreign RFID tag was detected entering the secured facility at a particular portal. This time stamp data can be used as a basis to allow tag values to be automatically removed from the STE list after a predetermined period of time (e.g., 2 hours).

For example, the time stamp metadata associated with a particular tag value can be automatically compared to a current time at 616. The current time can be determined by a system clock at an RFID portal system $100_1$ . . . $100_n$ and/or RFID system server 402. Based on such comparison, the particular tag value can then be automatically purged from the STE list if the corresponding time stamp metadata indicates that the tag value has been present on the STE list for a period which exceeds some predetermined duration of time. The duration of time can be chosen to be of sufficiently long duration so that any customer who enters the secured area with a foreign tag will most likely have departed from the secured facility before the tag value has been removed from the STE list.

If it is determined at 608 that a tag passing through a portal zone is not in the process of entering the secured area (608: No), then the process continues at 622 where a determination is made as to whether the tag is departing from the secured area. If so (622: Yes), then action 624 can optionally be performed to determine if the RFID tag is authorized for removal from the secured facility. For example, such authorization may be based on a notification of a point-of-sale (POS) transaction indicating that the merchandise associated with a particular RFID tag has been purchased by a customer. In such scenarios (624: Yes), the departure of the tag through the portal zone should be permitted at 626 without triggering any alarm.

If the RFID tag is a foreign tag, it will not be authorized for departure from the secured facility based on a POS transaction (624: No). Accordingly, the process will continue at 628 where actions are performed to compare the tag value associated with that particular RFID tag that is leaving the secured area, with tag values included in the STE list. If there is no matching tag value contained in the STE list (630: No) then an alarm or notification will be triggered at 632. If there is a matching tag value included in the STE list (630: Yes) then a system alarm and/or notification can be disabled or prevented at 634. Once the foreign RFID tag has departed the secured area, the corresponding tag value for such RFID tag can be automatically removed from the STE list at 636. Thereafter, the process can terminate at 638 or can continue with additional processing operations. For example, the process can return to 604 to continue with the RFID tag monitoring operations.

The systems described herein can comprise one or more components such as a processor, an application specific circuit, a programmable logic device, a digital signal processor, or other circuit programmed to perform the functions described herein. The system can be realized in one computer system or several interconnected computer systems. Any kind of computer system or other apparatus adapted for carrying out the methods described herein is suited.

Figure 8A:
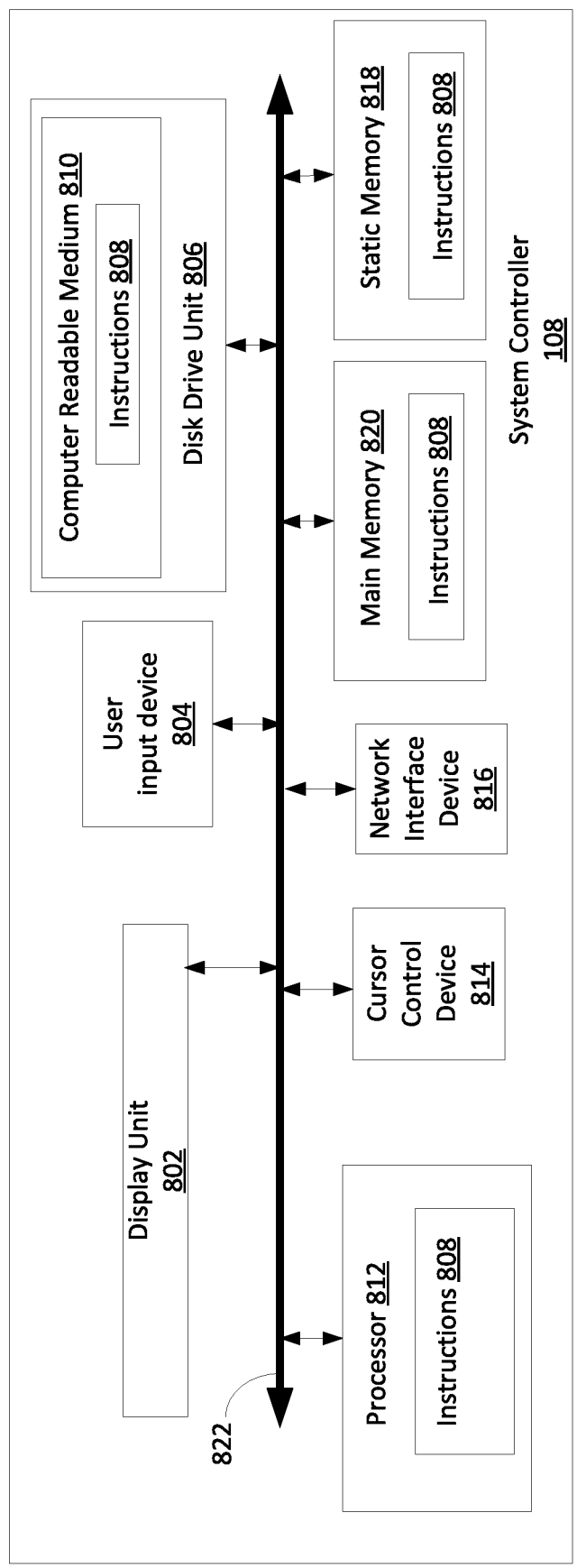
FIG. 8A is a block diagram that is useful for understanding a RFID portal system controller.

Referring now to FIG. 8A, a system controller 108 as described herein can include a processor 812 (such as a central processing unit (CPU)), a disk drive unit 806, a main memory 820 and a static memory 818, which communicate with each other via a bus 822. In some scenarios, the system controller 108 can further include a display unit 802, such as a video display (e.g., a liquid crystal display or LCD), a flat panel, or a solid state display. The system controller 108 can include a user input device 804 (e.g., a keyboard), a cursor control device 814 and a network interface device 816.

The disk drive unit 806 includes a computer-readable storage medium 810 on which is stored one or more sets of instructions 808 (e.g., software code) configured to implement one or more of the methodologies, procedures, or functions described herein. The instructions 808 can also reside, completely or at least partially, within the main memory 820, the static memory 818, and/or within the processor 812 during execution thereof by the system controller. The main memory 820 and the processor 812 also can constitute machine-readable media. An STE list 700 as described herein can be stored in the main memory 820 or any other suitable memory location associated with the system controller 108

Those skilled in the art will appreciate that the system controller architecture illustrated in FIG. 8A is one possible example of a system controller. However, the invention is not limited in this regard and any other suitable system controller architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and system controllers. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

The methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein. In the various embodiments of the present invention a network interface device 816 connected to a network environment communicates over the network using the instructions 808.

While the computer-readable storage medium 810 is shown to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure.

Figure 8B:
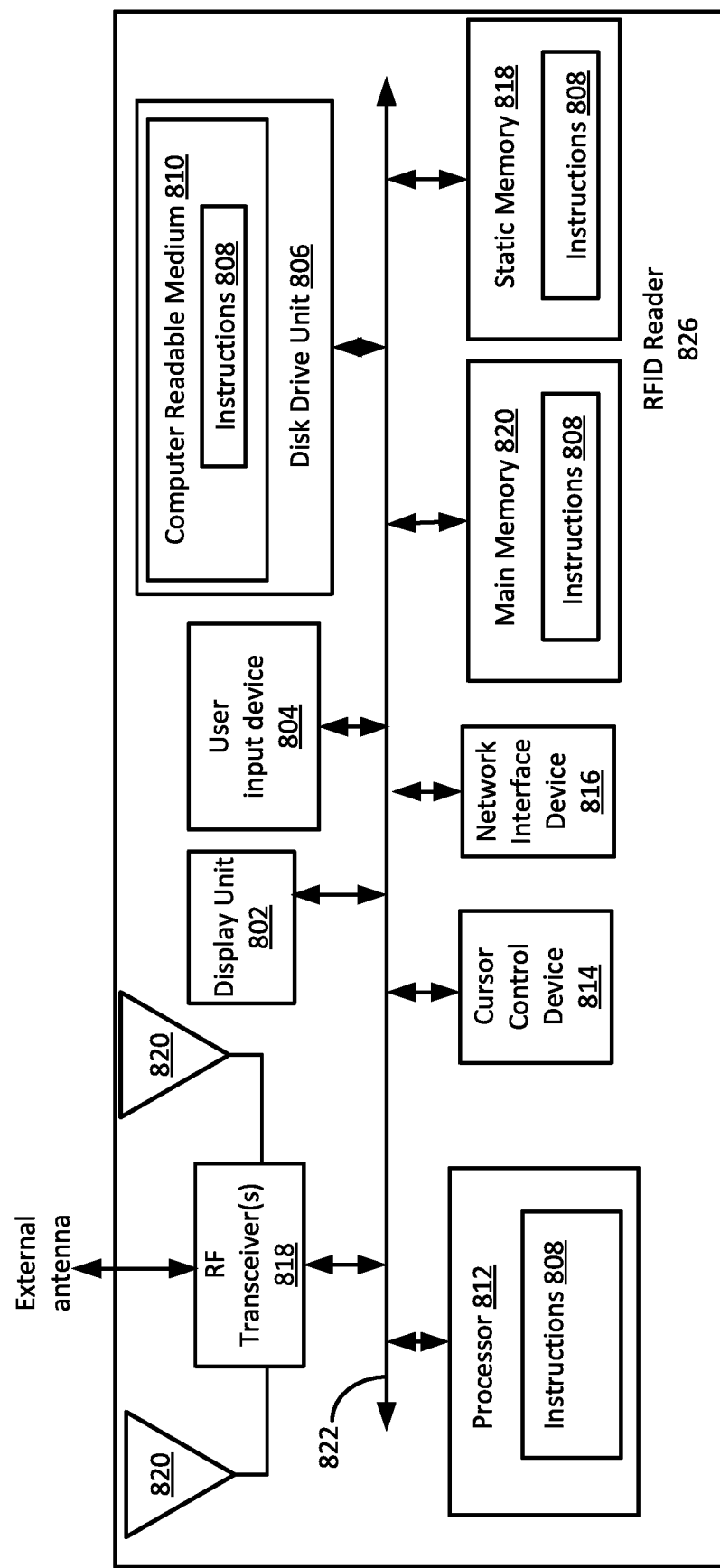
FIG. 8B is a block diagram that is useful for understanding an RFID reader with integrated control unit.

The functional features associated with a system controller 108 can optionally be integrated with the RFID reader. Such an RFID reader 826 is illustrated in FIG. 8B, which includes one or more of a processor 812 (e.g., a microprocessor or a microcontroller), a disk drive unit 806, a main memory 820 and a static memory 818, which communicate with each other via a bus 822. In some scenarios, the RFID reader 826 can further include a display unit 802, such as a video display (e.g., a liquid crystal display or LCD), a flat panel, or a solid state display. The RFID reader can include a user input device 804 (e.g., input keys and/or a keyboard), a cursor control device 814 and a network interface device 816.

Further the RFID reader 826 can include one or more RF transceiver(s) 818 and one or more antenna(s) 820. One or more of the RF transceivers can also be coupled to an external antenna system, such as antennas 102a, 102b. As such, the RFID reader 826 comprises an RF enabled device for allowing data to be wirelessly exchanged with one or more external devices (e.g., other RFID portal systems 100₁ . . . 100ₙ, RFID system server 402, RFID handheld reader 408 and/or RFID tags 110) via RF technology. The RFID reader 826 is configured to transmit RF carrier signals to the listed external devices, and/or transmit data response signals (e.g., reply signals). Further, RFID reader 826 is capable of receiving RF signals including information from a transmitting device (e.g., other RFID portal systems 100₁ . . . 100ₙ, RFID system server 402, RFID handheld reader 408 and/or RFID tags 110), and forwarding such information to the processor 812 for extracting the information therefrom. The processor 812 can store the extracted information (such as the STE list 700) in memory 820, and can execute algorithms using the extracted information.

It should be understood that the RFID reader 826 can include more or fewer components than are shown in FIG. 8B. However, the components shown are sufficient to disclose an illustrative solution. Some or all of the components of the RFID reader 826 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

Figure 9:
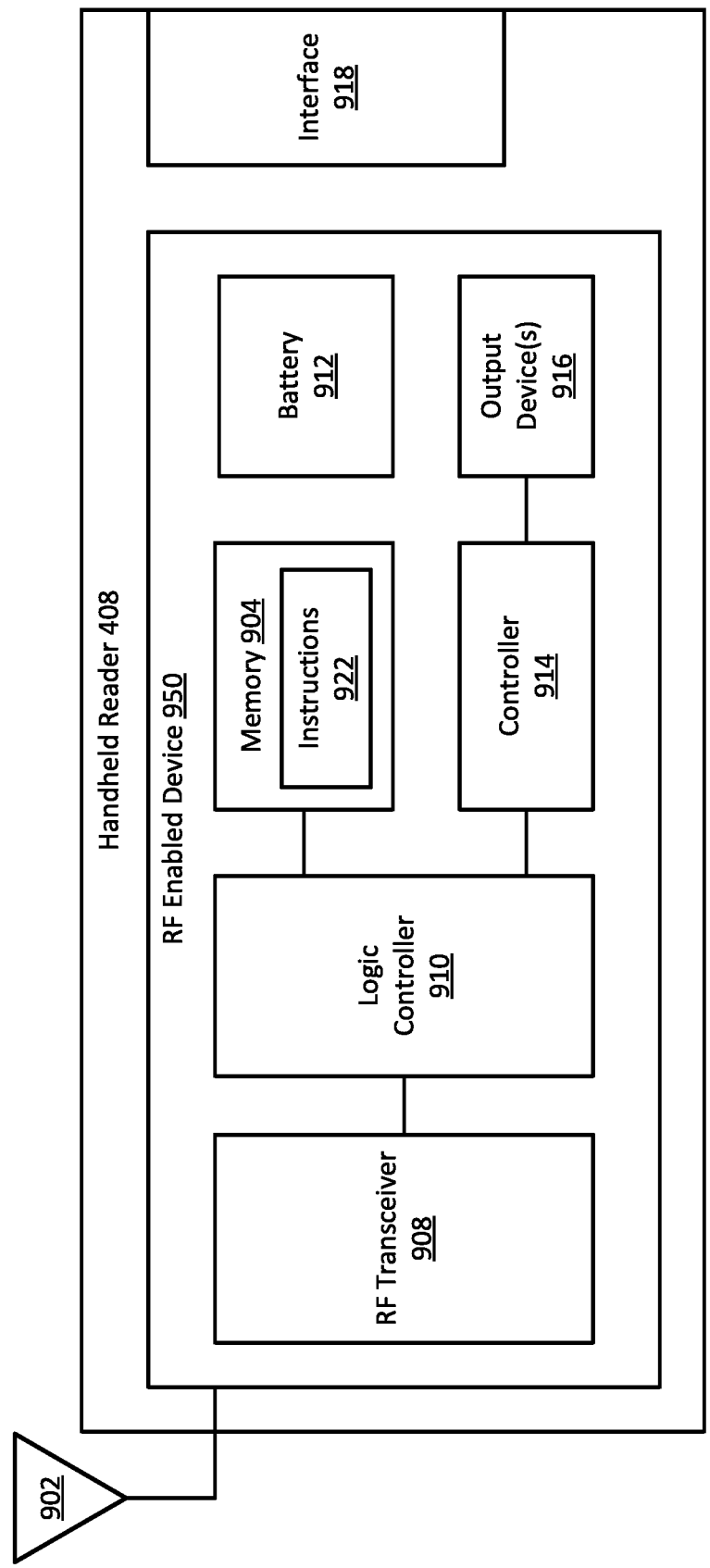
FIG. 9 is a block diagram that is useful to facilitate an understanding of a handheld RFID tag reader.

Referring now to FIG. 9, there is provided a detailed block diagram of an exemplary architecture for a handheld RFID tag reader 408. Handheld RFID tag reader 408 may include more or less components that that shown in FIG. 9. However, the components shown are sufficient to disclose an illustrative embodiment implementing the present invention. Some or all of the components of the handheld RFID tag reader 408 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The handheld RFID tag reader 408 comprises an RF enabled device for allowing data to be exchanged with an external device (e.g., RFID portal systems $100_1 \ldots 100_n$, RFID system server 402, and/or RFID tags 110) via RF technology. The components 904-916 shown in FIG. 9 may be collectively referred to herein as the RF enabled device 950, and include a power source 912 (e.g., a battery).

The RF enabled device 950 further comprises an antenna 902 for allowing data to be exchanged with the external device via RF technology (e.g., RFID technology or other RF based technology). The external device may comprise RFID portal systems $100_1 \ldots 100_n$, RFID system server 402, and/or RFID tags 110. In this case, the antenna 902 is configured to transmit RF carrier signals (e.g., interrogation signals) to the listed external devices, and/or transmit data response signals (e.g., authentication reply signals) generated by the RF enabled device 950. In this regard, the RF enabled device 950 comprises an RF transceiver 908. RFID transceivers are well known in the art, and therefore will not be described herein. However, it should be understood that the RF transceiver 908 receives RF signals including information from the transmitting device, and forwards the same to a logic controller 910 for extracting the information therefrom. The logic controller 910 can store the extracted information in memory 904, and execute algorithms using the extracted information.

Memory 904 may be a volatile memory and/or a non-volatile memory. For example, the memory 904 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 904 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 922 are stored in memory for execution by the RF enabled device 950 and that cause the RF enabled device 950 to perform any one or more of the methodologies of the present disclosure. The instructions 922 are generally operative to facilitate RFID tag reading operations and communication of certain data to RFID portal devices and/or RFID system server using a communications interface 918.

Figure 10:
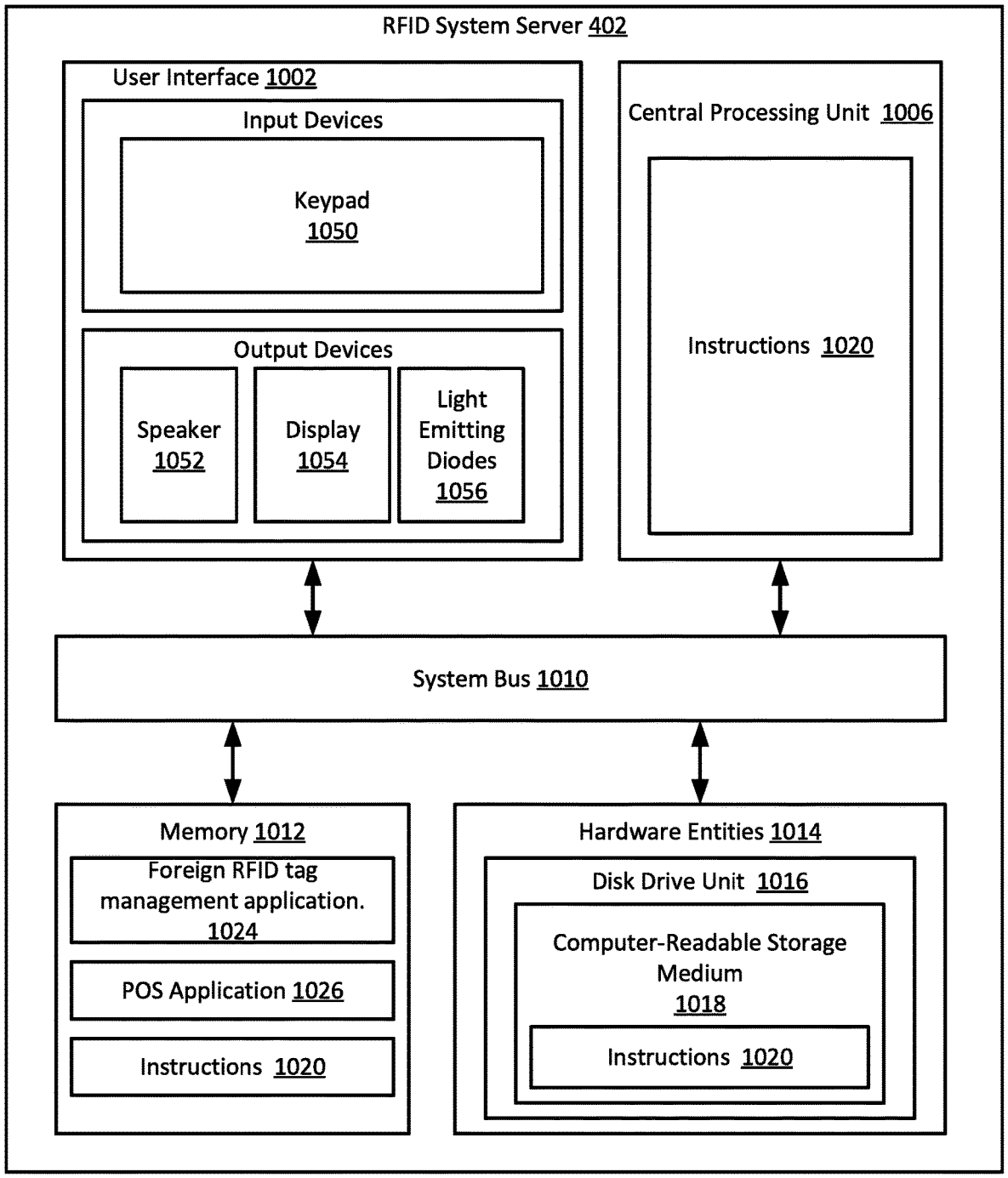
FIG. 10 is a block diagram that is useful to facilitate an understanding of an RFID system server.

Referring now to FIG. 10, there is provided a detailed block diagram of an exemplary architecture for an RFID system server 402. Notably, the RFID system server 402 may include more or less components than those shown in FIG. 10. However, the components shown are sufficient to disclose an illustrative embodiment implementing the present invention. The hardware architecture of FIG. 10 represents one embodiment of a representative RFID system server configured to facilitate the provision of an STE list as described herein. Some or all the components of the RFID system server 402 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 10, the RFID system server 402 comprises a user interface 1002, a Central Processing Unit ("CPU") 1006, a system bus 1010, a memory 1012 connected to and accessible by other portions of RFID system server 402 through system bus 1010, and hardware entities 1014 connected to system bus 1010. The user interface can include input devices (e.g., a keypad 1050) and output devices (e.g., speaker 1052, a display 1054, and/or light emitting diodes 1056), which facilitate user-software interactions for controlling operations of the RFID system server 402.

At least some of the hardware entities 1014 perform actions involving access to and use of memory 1012, which can be a Random Access Memory ("RAM"), a disk driver and/or a Compact Disc Read Only Memory ("CD-ROM"). Hardware entities 1014 can include a disk drive unit 1016 comprising a computer-readable storage medium 1018 on which is stored one or more sets of instructions 1020 (e.g., software code) configured to implement one or more of the methodologies, procedures, or functions described herein. The instructions 1020 can also reside, completely or at least partially, within the memory 1012 and/or within the CPU 1006 during execution thereof by the RFID system server 402. The memory 1012 and the CPU 1006 also can constitute machine-readable media. The term "machine-readable media", as used here, refers to a single medium or multiple media (e.g., a centralized or distributed database, and/or associated caches and servers) that store the one or more sets of instructions 1020. The term "machine-readable media", as used here, also refers to any medium that is capable of storing, encoding or carrying a set of instructions 1020 for execution by the RFID system server 402 and that cause the RFID system server 402 to perform any one or more of the methodologies of the present disclosure.

In some embodiments of the present invention, the hardware entities 1014 include an electronic circuit (e.g., a processor) programmed for facilitating the distribution and maintenance of an STE list to one or more RFID portal systems. In this regard, it should be understood that the electronic circuit can access and run a foreign RFID tag management software application 1024 installed on the RFID system server 402. The software application 1024 is generally operative to facilitate: adding and/or deleting tag values from one or more STE lists maintained by the server and/or RFID portal systems, determination of tag values based on tag data provided by the RFID portal systems, communicating certain data to and from RFID portal systems, and determining when RFID tag values should be added or removed from the STE list. In some scenarios, the RFID system server 402 can also facilitate communications with a point of sale server system (or may itself comprise a point of sale server system) which identifies tag values associated with RFID tags that are authorized to depart from a secured area. If the server performs POS functions, it can further include a POS application software 1026 which also executes on the server.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for managing RFID tags, comprising:
using a first RFID portal system to read tag data from an RFID tag present within a first portal zone;
using at least one processing device associated with the first RFID portal system to determine whether the RFID tag is entering an area, the determination based on an evaluation of a movement of the RFID tag through the first portal zone;
responsive to a determination that the RFID tag is entering the area, performing at least one operation to cause a first tag value corresponding to the tag data to be added into a list maintained in a memory device accessible to the at least one processing device,
wherein the list specifies one or more RFID tags which are allowed to transition out of the area without triggering a notification; and
preventing the first tag value from being added to the list when the at least one processing device determines that the RFID tag has entered the area concurrent with a number of other RFID tags.

2. The method according to claim 1, further comprising:
using a second RFID portal system to read a departing tag data from a departing RFID tag that is exiting the area; and
preventing the second RFID portal system from generating a second notification if a second tag value associated with the departing tag data matches at least one tag value stored in the list.

3. The method according to claim 2, wherein the second RFID portal system is the first RFID portal system.

4. The method according to claim 2, wherein the second RFID portal system is distinct from the first RFID portal system.

5. The method according to claim 4, further comprising communicating the first tag value to a central server in communication with the first RFID portal system and the second RFID portal system.

6. The method according to claim 4, further comprising communicating the first tag value to at least the second RFID portal system.

7. The method according to claim 4, further comprising maintaining the list at both the first RFID portal system and the second RFID portal system.

8. The method according to claim 1, further comprising removing the first tag value from the list responsive to at least one manual user control operation.

9. The method according to claim 1, further comprising removing the first tag value from the list after a duration of time.

10. The method according to claim 1, wherein preventing the first tag value from being added to the list comprises preventing addition to the list of one or more of tag values during at least one period of time.

11. An RFID portal system for managing RFID tags, comprising:
a first RFID portal comprising a first RFID reader including a control unit which is configured to:
generate one or more commands to cause the first RFID reader to read tag data from an RFID tag present within a first portal zone;
determine, based on an evaluation of a movement of the RFID tag through the first portal zone, whether the RFID tag is entering an area; and
responsive to a determination that the RFID tag is entering the area, perform at least one operation to cause a first tag value corresponding to the tag data to be added into a list maintained in at least one memory device, wherein the list specifies one or more RFID tags which are allowed to transition out of the area without triggering a notification; and
prevent the first tag value from being added to the list upon a determination that the RFID tag has entered the area concurrent with a number of other RFID tags.

12. The RFID portal system according to claim 11 further comprising:
a second RFID portal comprising:
a second RFID reader including a second control unit configured to generate one or more commands to cause the second RFID reader to:
read a departing tag data from a departing RFID tag that is exiting the area; and
prevent a second system controller from generating a second notification if a second tag value associated with the departing tag data matches at least one tag value in the list.

13. The RFID portal system according to claim 12, wherein the second RFID portal is the first RFID portal.

14. The RFID portal system according to claim 12, wherein the second RFID portal is distinct from the first RFID portal.

15. The RFID portal system according to claim 14, further comprising a central server which is configured to facilitate distribution of information concerning content of the list from the first RFID portal to at least the second RFID portal.

16. The RFID portal system according to claim 14, wherein the first RFID reader is configured to directly communicate the first tag value to at least the second RFID reader.

17. The RFID portal system according to claim 14, wherein each of the first RFID reader and the second RFID reader is configured to maintain a local copy of the list respectively in a first local data storage device and a second local data storage device.

18. The RFID portal system according to claim 11, wherein the first RFID reader is configured to remove the first tag value from the list responsive to at least one manual user control operation.

19. The RFID portal system according to claim 11, wherein the first RFID reader is configured to remove the first tag value from the list after a duration of time.

20. The RFID portal system according to claim 11, wherein to prevent the first tag value from being added to the list, the first RFID reader is configured to prevent addition to the list of one or more of tag values during at least one period of time.

* * * * *